(12) United States Patent
Noma

(10) Patent No.: US 6,710,985 B2
(45) Date of Patent: Mar. 23, 2004

(54) MAGNETORESISTIVE FILM, MAGNETORESISTIVE HEAD, AND INFORMATION REGENERATION APPARATUS

(75) Inventor: Kenji Noma, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 280 days.

(21) Appl. No.: 09/735,388

(22) Filed: Dec. 12, 2000

(65) Prior Publication Data

US 2002/0008946 A1 Jan. 24, 2002

(30) Foreign Application Priority Data

Jun. 14, 2000 (JP) ........................................ 2000-177923

(51) Int. Cl.$^7$ ................................................ G11B 5/39
(52) U.S. Cl. ................................ 360/324.11; 338/32 R; 324/252
(58) Field of Search .......................... 360/324, 324.11, 360/324.12; 338/32 R; 324/252

(56) References Cited

U.S. PATENT DOCUMENTS

| | | | | |
|---|---|---|---|---|
| 5,574,605 A | * | 11/1996 | Baumgart et al. | 360/324.11 |
| 5,583,725 A | * | 12/1996 | Coffey et al. | 360/324.11 |
| 5,608,593 A | * | 3/1997 | Kim et al. | 360/324.12 |
| 5,701,223 A | * | 12/1997 | Fontana et al. | 360/324.11 |
| 5,869,963 A | * | 2/1999 | Saito et al. | 324/252 |
| 6,010,781 A | * | 1/2000 | Aoshima et al. | 428/332 |
| 6,046,892 A | * | 4/2000 | Aoshima et al. | 360/324.11 |
| 6,183,893 B1 | * | 2/2001 | Futamoto et al. | 428/694 TS |
| 6,221,518 B1 | * | 4/2001 | Araki et al. | 428/692 |
| 6,222,707 B1 | * | 4/2001 | Huai et al. | 360/324.1 |
| 6,275,362 B1 | * | 8/2001 | Pinarbasi | 360/324.12 |
| 6,407,890 B1 | * | 6/2002 | Gill | 360/314 |
| 6,411,476 B1 | * | 6/2002 | Lin et al. | 360/324.11 |
| 6,456,469 B1 | * | 9/2002 | Gill | 360/324.11 |

FOREIGN PATENT DOCUMENTS

| | | |
|---|---|---|
| JP | 11074123 | 3/1999 |
| JP | 11328625 | 11/1999 |
| JP | 11330587 | 11/1999 |
| JP | 200022239 | 1/2000 |

* cited by examiner

*Primary Examiner*—Brian E. Miller
(74) *Attorney, Agent, or Firm*—Greer, Burns & Crain, Ltd.

(57) ABSTRACT

There is provided a magnetoresistive film in which an interlayer coupling field $H_{in}$ is minimized and a large regeneration output is produced. A multilayered film includes an underlayer 1, an antiferromagnetic layer 2, a pinned magnetic layer 3, a nonmagnetic middle layer 4, and a free magnetic layer 5, the pinned magnetic layer comprises a first soft magnetic layer 3_1 and a second soft magnetic layer 3_3 formed of soft magnetic materials and an antiparallel coupling middle layer 3_2, formed between the soft magnetic layers, for coupling the magnetizations of the soft magnetic layers to each other in opposite directions, the antiferromagnetic layer comprises an ordered-form antiferromagnetic material including Mn, and a second underlayer 1_2 as a direct substrate of the antiferromagnetic layer comprises a metal selected from the group consisting of Ru, Os, Re, Tc, Cd, Ti, Zn, Al, Au, Ir, Pd, Pt, Rh, Ag, Nb, Mo, W, V, and α-Ta or an alloy including an element of the selected metal.

8 Claims, 7 Drawing Sheets fcc STRUCTURE
(ex. NiFe, PdPtMn)

(111) PLANE bcc STRUCTURE      (110) PLANE hcp STRUCTURE (ex.Ru)      (001) PLANE

MAGNETORESISTIVE FILM, MAGNETORESISTIVE HEAD, AND INFORMATION REGENERATION APPARATUS

BACKGROUND OF THE INVENTION

1. Field of the Invention

The present invention relates to a magnetoresistive film which indicates a resistance change in accordance with an external magnetic field strength, a magnetoresistive head for utilizing the resistance change of the magnetoresistive film to detect the external magnetic field strength, and an information regeneration apparatus for regenerating information recorded in a recording medium.

2. Description of Related Art

In recent years, with the spread of computers, a large amount of information has been handled in a daily manner. Such information is recorded on a recording medium by a large number of physical marks, and regenerated by an information regeneration apparatus for reading the mark on the recording medium to regenerate an electric regeneration signal.

A hard disk drive (HDD) is one of the information regeneration apparatuses, and is characterized in that a memory capacity is large and access speed to the information is fast. The HDD is provided with a magnetic disk as the recording medium whose surface is formed of a magnetic material, and a regeneration head for regenerating the information recorded on the magnetic disk. For the magnetic disk, a surface is magnetized for each micro area (one-bit region), and one bit of information is recorded in a form of a magnetization direction of the one-bit region. The regeneration head is disposed in the vicinity of the magnetic disk, and outputs the electric regeneration signal in accordance with a signal magnetic field $H_{sig}$ generated from the magnetization of one-bit region of the magnetic disk to regenerate the information recorded on the magnetic disk.

As recording density of the magnetic disk continues to be enhanced year by year, an area of a one-bit region decreases with enhancement of the recording density, and the signal magnetic field $H_{sig}$ generated from the one-bit region is weakened. Therefore, the regeneration head for outputting a large regeneration signal is necessary even for this weak signal magnetic field $H_{sig}$. As the magnetic head for outputting the large regeneration signal, a spin valve magnetoresistive head which is a magnetoresistive head utilizing a giant magnetoresistive (GMR) effect starts to be put to practical use in earnest. The spin valve magnetoresistive head will be hereinafter referred to as a SVMR head.

The SVMR head is provided with a spin valve magnetoresistive film as a multilayered film including a free magnetic layer whose magnetization direction changes in accordance with the signal magnetic field $H_{sig}$ or another external magnetic field, a nonmagnetic middle layer formed adjacent to the free magnetic layer and provided with conductivity, a pinned magnetic layer formed adjacent to the nonmagnetic middle layer and provided with a magnetization direction fixed in a predetermined direction, and an antiferromagnetic layer formed adjacent to the pinned magnetic layer and constituted of an antiferromagnetic material for fixing the magnetization direction of the pinned magnetic layer. For the magnetoresistive film, sheet resistance $\rho/t$ changes with relative angle changes of the magnetization directions of the free magnetic layer and pinned magnetic layer. When the magnetization directions of both layers are matched with each other in opposite directions, the sheet resistance $\rho/t$ of the magnetoresistive film is maximized. When the magnetization directions of both layers are matched with each other in the same direction, the sheet resistance $\rho/t$ is minimized. Therefore, by knowing the sheet resistance $\rho/t$ of the magnetoresistive film, conversely, magnitude and direction of the external magnetic field can be known. A difference between a maximum value and a minimum value of the sheet resistance $\rho/t$ will be hereinafter referred to as resistance change $\Delta\rho/t$.

The magnetoresistive film is provided with a pair of electrode terminals, and during operation a sense current is passed to the magnetoresistive film from the pair of electrode terminals. While the sense current flows, and when the SVMR head is relatively moved in the vicinity of a magnetic disk, an electric resistivity of the magnetoresistive film successively changes in accordance with the signal magnetic field $H_{sig}$ from the magnetic disk, and a regeneration signal provided with an output voltage represented by a product of the electric resistivity and sense current value is outputted. The output of the regeneration signal of the SVMR head is substantially proportional to the resistance change $\Delta\rho/t$. In general, since the spin valve magnetoresistive film has a large resistance change $\Delta\rho/t$, the SVMR head outputs a high-output regeneration signal.

As one measure for obtaining a higher output from the SVMR head, there is proposed reduction of a height (length in a direction perpendicular to a surface opposite to the magnetic disk) of the magnetoresistive film. By reducing the height, a sectional area of a conductive path for passing the sense current decreases, the resistance change $\Delta\rho/t$ increases, and the large-output regeneration signal is obtained.

However, since the magnetization direction of the pinned magnetic layer is fixed in the height direction, simply with the reduction of the height, a diamagnetic field of the pinned magnetic layer increases, and the fixing of the magnetization of the pinned magnetic layer is weakened. When the magnetization fixing is weakened, an angle formed by the magnetization directions of the free magnetic layer and pinned magnetic layer of the magnetoresistive film largely deviates from an ideal angle of 90 degrees. With such an angle deviating state, the resistance of the magnetoresistive film fails to linearly respond to a change of the signal magnetic field $H_{sig}$, and symmetry of SVMR head regeneration waveform is deteriorated with respect to a positive/negative signal magnetic field $H_{sig}$. Moreover, the deterioration of symmetry results in a decrease of a dynamic range on either the positive or negative side of the output voltage, and a substantial regeneration output decreases.

In order to decrease the diamagnetic field, known is a magnetoresistive film constituted of a laminated ferri-film in which the pinned magnetic layer is provided with a three-layer structure including a first soft magnetic layer, a second soft magnetic layer, and an antiparallel coupling middle layer, held between the first and second soft magnetic layers, for coupling the magnetizations of the soft magnetic layers to each other substantially in parallel or in opposite directions. In the laminated ferri-film, since the respective magnetizations of the first and second soft magnetic layers are directed and fixed in the opposite directions, the diamagnetic field is weak, and influence of the external magnetic field is hardly exerted, so that even when the height is reduced, the magnetization direction is firmly fixed. Therefore, by employing the laminated ferri-film in the pinned magnetic layer, the high output of the SVMR head can be obtained.

In order to obtain a much higher output from the SVMR head, for example, it is known that thickness of the free magnetic layer or the nonmagnetic middle layer is preferably reduced. This is because by forming these layers to be thin, an excess shunt current flowing through these layers and not contributing to a magnetoresistive effect is depressed and the resistance change Δρ/t increases.

However, the magnetization of the free magnetic layer of the magnetoresistive film is given, from the magnetization of the pinned magnetic layer, an interlayer coupling field $H_{in}$ attributed to interlayer coupling of these magnetizations, and with reduction of the thickness of the free magnetic layer or the nonmagnetic middle layer, this interlayer coupling field $H_{in}$ increases. Since the interlayer coupling field $H_{in}$ allows the angle formed by the magnetization directions of the free magnetic layer and pinned magnetic layer to deviate from the ideal angle of 90°, with an increase of the interlayer coupling field $H_{in}$, the substantial regeneration output of the SVMR head decreases. Particularly, when the pinned magnetic layer is constituted of a ferri-pin, the interlayer coupling field $H_{in}$ increases to exceed 1.6 kA/m, and raises a problem.

SUMMARY OF THE INVENTION

The present invention has been developed in consideration of the aforementioned situations, and an object thereof is to provide a magnetoresistive film in which an interlayer coupling field $H_{in}$ is minimized and a large regeneration output is produced, a magnetoresistive head, and an information regeneration apparatus.

To attain the aforementioned object, according to the present invention, there is provided a magnetoresistive film which is a multilayered film including: an underlayer; an antiferromagnetic layer formed on the underlayer; a pinned magnetic layer having magnetization whose direction is fixed by the antiferromagnetic layer; and a free magnetic layer having magnetization whose direction changes in accordance with an external magnetic field, and which indicates a magnitude of resistance in accordance with an angle formed by the magnetization direction of the pinned magnetic layer and the magnetization direction of the free magnetic layer.

In the magnetoresistive film, the pinned magnetic layer comprises a first soft magnetic layer and a second soft magnetic layer formed of soft magnetic materials and an antiparallel coupling middle layer, formed between the soft magnetic layers, for coupling the magnetizations of the soft magnetic layers to each other in opposite directions.

For the magnetoresistive film of the present invention, in a first magnetoresistive film, the antiferromagnetic layer comprises an ordered-form antiferromagnetic material including Mn, and the underlayer comprises a metal selected from the group consisting of Ru, Os, Re, Tc, Cd, Ti, Zn, Al, Au, Ir, Pd, Pt, Rh, Ag, Nb, Mo, W, V, and α-Ta or an alloy including an element of the selected metal.

In the first magnetoresistive film of the present invention, the underlayer comprises Ru or an alloy including Ru, instead of the metal selected from the group or the alloy including the selected metal element in some cases.

Moreover, in the first magnetoresistive film of the present invention, the antiferromagnetic layer comprises a material containing 55 atom % or less of Mn and including an element selected from an element group consisting of Pd, Pt, Ru, Rh, Ir, Au, and Ni in some cases.

In general, as the antiferromagnetic material constituting the antiferromagnetic layer of the magnetoresistive film, the ordered-form antiferromagnetic material including Mn as described above is employed in many cases.

Moreover, as described in the related art, in general, for the magnetoresistive film, when the pinned magnetic layer has a multilayered structure including the soft magnetic layer and antiparallel coupling middle layer, the large regeneration output is produced, but the interlayer coupling field $H_{in}$ also easily indicates a large value, and with the increase of the interlayer coupling field $H_{in}$ the regeneration output decreases.

On the other hand, for the first magnetoresistive film of the present invention, since the pinned magnetic layer has the multilayered structure, and the appropriate material is selected as the underlayer material to constitute a substrate of the antiferromagnetic layer, as described later in an embodiment, a magnitude of the interlayer coupling field $H_{in}$ is minimized and a large regeneration output is produced.

For the magnetoresistive film of the present invention, in a second magnetoresistive film, the antiferromagnetic layer comprises an ordered-form antiferromagnetic material including Mn, and is adjacent to the underlayer by a closest surface of a crystal of the antiferromagnetic material, the underlayer is adjacent to the antiferromagnetic layer by the closest surface of the crystal of a substrate material constituting the underlayer, and a ratio of a closest interatomic distance of the substrate material to the closest interatomic distance of the antiferromagnetic material is in a range of 0.92 to 1.08.

In the second magnetoresistive film of the present invention, the underlayer comprises Ru or an alloy including Ru in some cases.

Moreover, in the second magnetoresistive film of the present invention, the antiferromagnetic layer comprises a material containing 55 atom % or less of Mn and including an element selected from an element group consisting of Pd, Pt, Ru, Rh, Ir, Au, and Ni.

For the second magnetoresistive film, since the pinned magnetic layer is provided with the multilayered structure, and the material having the appropriate closest interlayer distance is selected as the material of the underlayer as the substrate of the antiferromagnetic layer, as described later in the embodiment, the magnitude of the interlayer coupling field $H_{in}$ is minimized and the large regeneration output is produced.

To attain the aforementioned object, according to the present invention, there is provided a magnetoresistive head comprising a magnetoresistive film which is a multilayered film including: an underlayer; an antiferromagnetic layer formed on the underlayer; a pinned magnetic layer having magnetization whose direction is fixed by the antiferromagnetic layer; and a free magnetic layer having magnetization whose direction changes in accordance with an external magnetic field, and which indicates a magnitude of resistance in accordance with an angle formed by the magnetization direction of the pinned magnetic layer and the magnetization direction of the free magnetic layer. The magnetoresistive head detects the magnitude of the resistance of the magnetoresistive film to detect a strength of the external magnetic field.

For the magnetoresistive head of the present invention, a first magnetoresistive head comprises the first magnetoresistive film of the present invention as the magnetoresistive film.

For the magnetoresistive head of the present invention for attaining the object, a second magnetoresistive head comprises the second magnetoresistive film of the present invention as the magnetoresistive film.

Since the magnetoresistive head of the present invention employs the magnetoresistive film of the present invention as the magnetoresistive film, the pinned magnetic layer is provided with the multilayered structure, further the interlayer coupling field $H_{in}$ is minimized, and the regeneration output is large.

In order to attain the object, according to the present invention, there is provided an information regeneration apparatus which comprises a magnetic head, disposed in the vicinity of or in contact with a magnetic recording medium on which information is recorded in accordance with a magnetization direction, for detecting magnetization directions of respective points of the magnetic recording medium, and regenerates the information in accordance with the magnetization directions of the respective points of the magnetic recording medium detected by the magnetic head.

For the information regeneration apparatus of the present invention, a first information regeneration apparatus comprises the first magnetoresistive head of the present invention as a magnetic head.

For the information regeneration apparatus of the present invention for attaining the object, a second information regeneration apparatus comprises the second magnetoresistive head of the present invention as the magnetic head.

For these information regeneration apparatuses of the present invention, since the magnetoresistive head of the present invention is employed as the magnetic head, the regeneration output is large, and the apparatuses are suitable for regeneration of the information from a high-density recorded magnetic disk.

DETAILED DESCRIPTION OF THE PREFERRED EMBODIMENTS

A preferred embodiment of the present invention will be described hereinafter.

Figure 1:
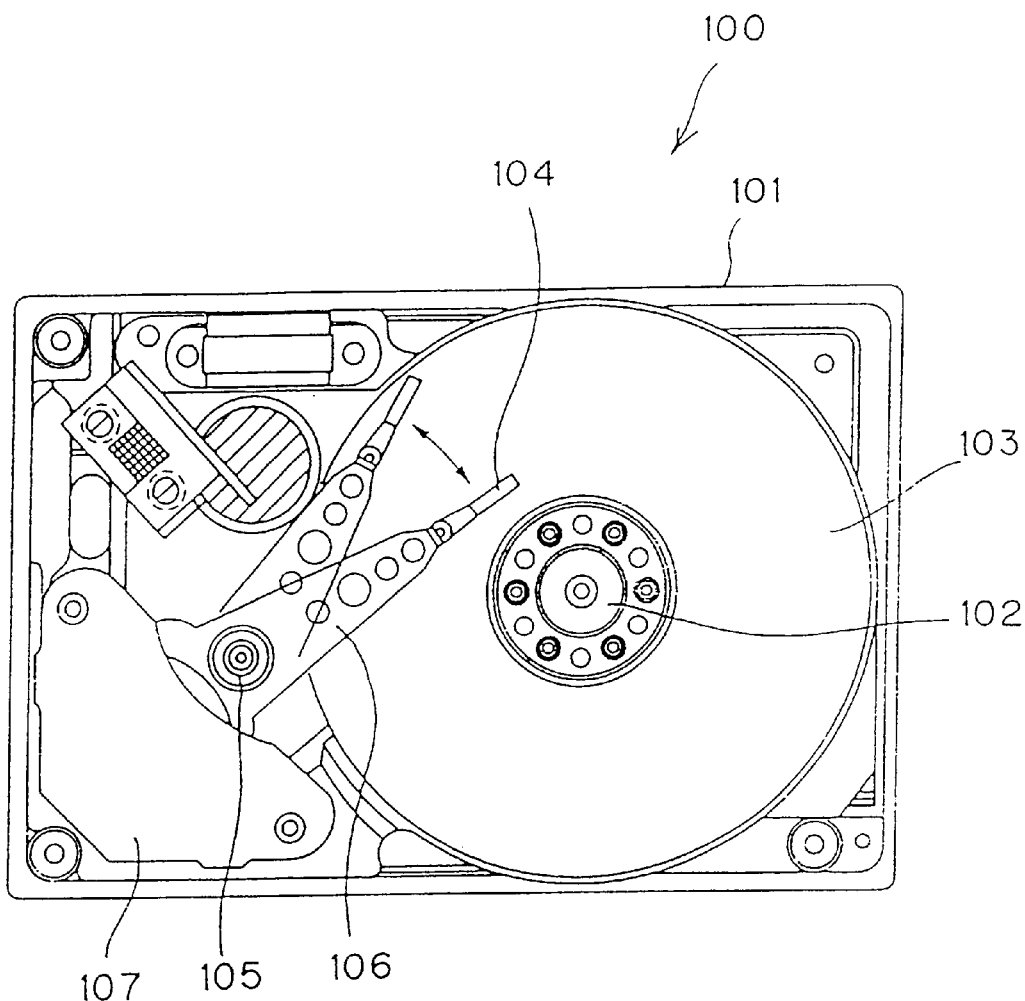
FIG. 1 is a schematic view of a hard disk drive of the present embodiment.

FIG. 1 is a schematic view of a hard disk drive of the present embodiment.

A hard disk drive (HDD) 100 shown in FIG. 1 corresponds to an information regeneration apparatus of the present invention. A housing 101 of the HDD 100 shown in FIG. 1 contains: a rotation shaft 102; a magnetic disk 103 attached to the rotation shaft 102; a floating head slider 104 disposed close to and opposite to the surface of the magnetic disk 103; an arm shaft 105; a carriage arm 106, provided with the floating head slider 104 fixed to a tip end thereof, for horizontally moving on the magnetic disk 103 centering on the arm shaft 105; and an actuator 107 for driving the horizontal movement of the carriage arm 106.

The HDD 100 performs recording of information in the magnetic disk 103, and regeneration of the information recorded in the magnetic disk 103. During the recording and regeneration of the information, first the actuator 107 constituted of a magnetic circuit drives the carriage arm 106, and the floating head slider 104 is positioned in a desired track on the rotating magnetic disk 103. A magnetic head, not shown in FIG. 1, of the present embodiment is mounted on the tip end of the floating head slider 104. The magnetic head corresponds to a magnetoresistive head of the present invention. The magnetic head successively approaches respective one-bit regions arranged on respective tracks of the magnetic disk 103 by rotation of the magnetic disk 103. During the information recording, an electric recording signal is inputted to the magnetic head, the magnetic head applies a magnetic field to each of the one-bit regions in response to the inputted recording signal, and the information carried by the recording signal is recorded in the form of a magnetization direction of the one-bit region. Moreover, during the information regeneration, the magnetic head extracts the information recorded in the form of the magnetization direction of each one-bit region by generating an electric regeneration signal generated in accordance with the magnetic field generated from magnetization. An inner space of the housing 101 is closed by a cover (not shown).

The magnetic head of the present embodiment will next be described.

Figure 2:
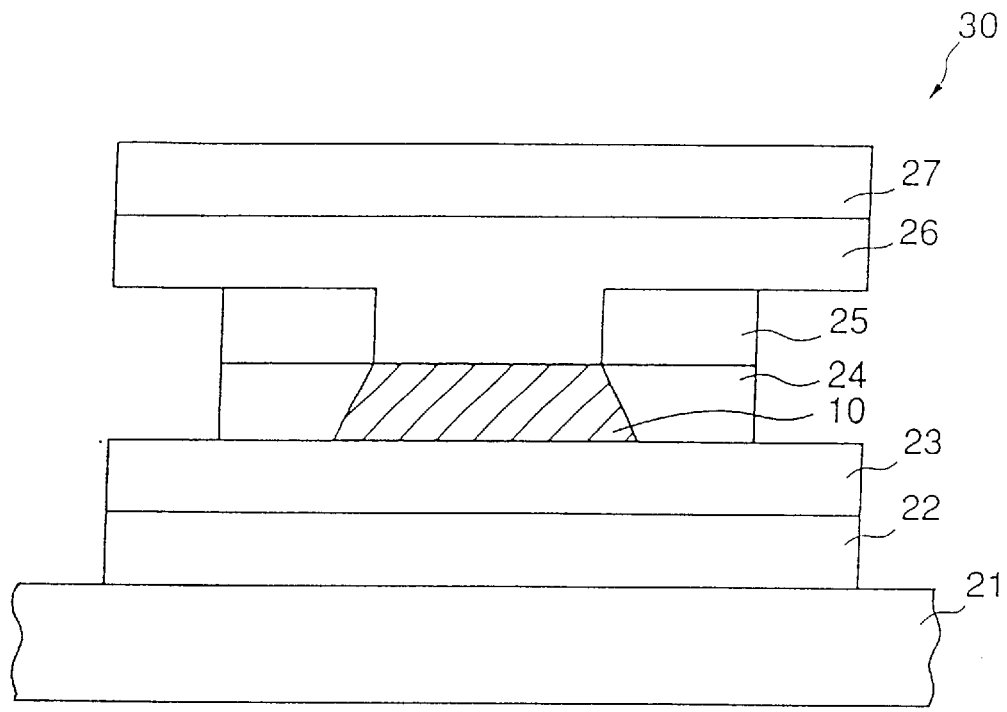
FIG. 2 is a main part perspective view of a magnetic head of the present embodiment.

FIG. 2 is a main part sectional view of the magnetic head of the present embodiment.

A magnetic head 30 of the present embodiment is a composite magnetic head provided with a recording section for recording the information in the magnetic disk 103 and a regeneration section for regenerating the information, and only the regeneration section is shown in FIG. 2. FIG. 2 is a sectional view of the regeneration section of the magnetic head cut along a plane parallel to a floating surface facing the magnetic disk 103 shown in FIG. 1.

The magnetic head 30 includes a nonmagnetic substrate 21, a lower shield layer 22 formed on the nonmagnetic substrate 21, a lower insulation layer 23 formed on the lower shield layer 22, a magnetoresistive film 10 formed on the lower insulation layer 23, a pair of left and right magnetic domain control layers 24 formed on the lower insulation layer 23 to hold the magnetoresistive film 10 from both sides, a pair of left and right electrodes 25 formed on the pair of left and right magnetic domain control layers 24, an upper insulation layer 26 formed on the pair of left and right electrodes 25 and magnetoresistive film 10, and an upper shield layer 27 formed on the upper insulation layer 26. The recording head is formed on the upper shield layer 27.

The substrate 21 is constituted by forming an Si film or an SiO$_2$ film on a substrate formed, for example, of alumina titanium carbide (Al$_2$O$_3$—TiC).

The lower shield layer 22 and upper shield layer 27 are formed of soft magnetic materials, and magnetically shield the magnetoresistive film 10 in such a manner that an unnecessary external magnetic field fails to be applied to the magnetoresistive film 10. Each of these shield layers is, for example, a layer of FeN with a thickness of 1.6 µm.

The lower insulation layer 23 and upper insulation layer 26 are formed of insulation materials, and prevent current leaks from the magnetoresistive film 10, the magnetic domain control layer 24, and the pair of electrodes 25. Each of these insulation layers is, for example, a layer of alumina (Al$_2$O$_3$) with a thickness of 30 nm.

The magnetic domain control layer 24 applies a static magnetic field and a magnetic field by exchange interaction to the magnetoresistive film 10. The magnetic field provides a free magnetic layer 5 described later with a single magnetic domain, and Barkhausen noise generated in the regeneration signal accompanying a moving magnetic wall is inhibited from occurring. The magnetic domain control layer 24 is formed of a CoPt alloy, a CoCrPt alloy or another material indicating a hard magnetic property. Here, the magnetic domain control layer 24 is laminated to provide the same height as that of the magnetoresistive film 10.

The electrode 25 applies a sense current to the magnetoresistive film 10 via the magnetic domain control layer 24, and the regeneration signal is extracted from the pair of electrodes 25. The electrode 25 is formed of conductive materials such as a multilayered film of Ta/(TiW)/Ta consisting of two Ta films and a TiW alloy film held between these Ta films.

The magnetoresistive film 10 is a portion having a function of information regeneration of the magnetic head 30. Specifically, the resistance of the magnetoresistive film 10 changes in accordance with the magnetic field generated from the magnetization of each one-bit region of the magnetic disk 103. Since the electrode 25 applies the sense current to the magnetoresistive film 10 as described above, the information carried by the magnetization direction of each one-bit region is extracted as the electric regeneration signal by the resistance change.

A characteristic of the present invention lies in a structure of the magnetoresistive film 10. The structure of the magnetoresistive film 10 will next be described.

Figure 3:
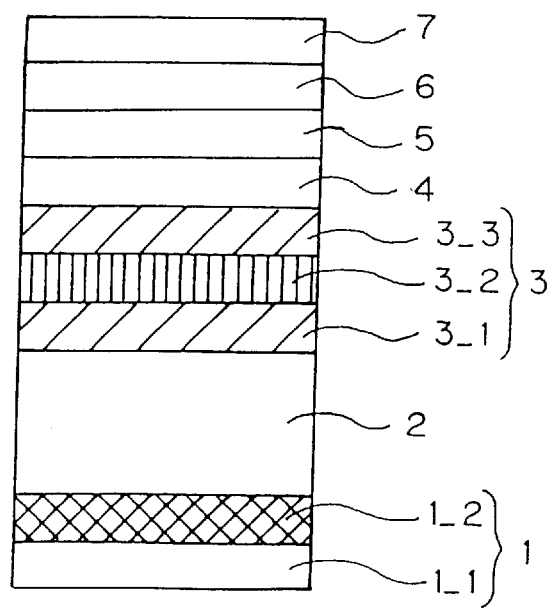
FIG. 3 is a sectional view of a magnetoresistive film of the present embodiment.

FIG. 3 is a sectional view of the magnetoresistive film of the present embodiment.

The magnetoresistive film 10 of the present embodiment shown in FIG. 3 is one example of a spin valve magnetoresistive film, and is constituted of: an underlayer 1 formed on the lower insulation layer 23 shown in FIG. 2; an antiferromagnetic layer 2 formed on the underlayer 1; a pinned magnetic layer 3 formed on the antiferromagnetic layer 2; a nonmagnetic middle layer 4 formed on the pinned magnetic layer 3; a free magnetic layer 5 formed on the nonmagnetic middle layer 4; a spin filter layer 6 formed on the free magnetic layer 5; and a protective layer 7 formed on the spin filter layer 6.

The respective layers constituting the magnetoresistive film 10 of the present embodiment will be described hereinafter.

The underlayer 1 is a layer as a substrate of the respective layers constituting the magnetoresistive film 10. The underlayer 1 is constituted, for example, of a first underlayer 1_1 of β-Ta with a thickness of 50 angstroms(Å) formed on the lower insulation layer 23, and a second underlayer 1_2 of an Ru with a thickness of 18 angstroms formed on the first underlayer 1_1. The underlayer 1 may be any single-layer film, for example, of Ru, but when the second underlayer 1_2 of Ru is formed on the first underlayer 1_1, Ru constituting the second underlayer 1_2 is more preferably oriented in (001) plane of an hcp structure.

The antiferromagnetic layer 2 is a layer of an ordered-form antiferromagnetic material including Mn, and is formed, for example, of a PdPtMn alloy film with a thickness of 150 angstroms. Here, the antiferromagnetic layer 2 has a magnetic moment directed in a direction perpendicular to the floating surface in an interface on the side of the pinned magnetic layer 3 described later in detail. By the magnetic moment, a generated magnetic field attributed to interlayer coupling between the magnetic moment and the magnetization of the pinned magnetic layer 3 is applied to the pinned magnetic layer 3. The magnetization of the pinned magnetic layer 3 is pinned by the magnetic field.

The ordered-form antiferromagnetic material including Mn to constitute the antiferromagnetic layer 2 is not limited to the PdPtMn alloy, and is realized by a material containing 55 atom % or less of Mn and including an element selected from an element group consisting of Pd, Pt, Ru, Rh, Ir, Au, and Ni. For the ordered-form antiferromagnetic material, as compared with disordered-form antiferromagnetic materials such as FeMn and NiO, in general, an anisotropic energy of the magnetic moment in the surface and interface is large, and a blocking temperature at which anisotropism of the magnetic moment in the surface and interface disappears is high. Therefore, when the antiferromagnetic layer 2 comprises the ordered-form antiferromagnetic material, the magnetization of the pinned magnetic layer 3 is steadily fixed in a height direction of the magnetoresistive film.

For the conventional antiferromagnetic layer comprising the ordered-form antiferromagnetic material including Mn as described above, an NiFe alloy is usually used as a direct substrate of the antiferromagnetic layer. This is because the substrate of the antiferromagnetic layer comprises the NiFe alloy instead of β-Ta and the magnetization of the pinned magnetic layer is more firmly pinned.

An effective pinning strength of the magnetization of the pinned magnetic layer is represented by a pinning magnetic field $H_{ua}*$. This pinning magnetic field $H_{ua}*$ represents an effective magnetic field whose magnetization direction is reversed when an external magnetic field is applied to the magnetoresistive film in a direction opposite to the magnetization direction of the entire pinned magnetic layer. Strict definition of the pinning magnetic field $H_{ua}*$ will be described later. As described later in an example, a strength of the pinning magnetic field $H_{ua}*$ of the magnetoresistive film 10 of the present embodiment is substantially of the same degree as that of the strength of the pinning magnetic field $H_{ua}*$ in the conventional magnetoresistive film constituted by replacing the second underlayer 1_2 of the magnetoresistive film 10 with a layer of NiFe, and is slightly strong. Even in the magnetoresistive film 10 of the present embodiment, the magnetization of the pinned magnetic layer 3 is sufficiently strongly pinned.

The pinned magnetic layer 3 is a layer including a soft magnetic material and is provided with magnetization whose direction is fixed by the interlayer coupling field applied from the antiferromagnetic layer 2. The pinned magnetic layer 3 is a so-called laminated ferri-film constituted of a first soft magnetic layer 3_1 and a second soft magnetic layer 3_3 indicating soft magnetic properties, and an antiparallel coupling middle layer 3_2, held between these soft magnetic layers in a film thickness direction, for coupling magnetizations of the soft magnetic layers to each other in opposite directions.

The first soft magnetic layer 3_1 is formed to be adjacent to the antiferromagnetic layer 2 in the thickness direction, and the second soft magnetic layer 3_3 is formed to be adjacent to the nonmagnetic middle layer 4 in the thickness direction. The first soft magnetic layer 3_1 is formed, for example, of a CoFeB alloy film with a thickness of 12.5 angstroms, and the second soft magnetic layer 3_3 is formed, for example, of the CoFeB alloy film with a thickness of 20 angstroms. Moreover, the antiparallel coupling middle layer 3_2 is formed, for example, of an Ru film with a thickness of 7.5 angstroms.

In general, for the pinned magnetic layer of the laminated ferri-film, since two soft magnetic layers are provided with magnetizations directed in opposite directions, the magnitude of the magnetization of the entire pinned magnetic layer is small. Therefore, the magnetization of the pinned magnetic layer of the laminated ferri-film is steadily pinned, because its diamagnetic field is small and influence of the magnetic field from the outside is not easily exerted. In this case, the pinning magnetic field $H_{ua}{}^*$ is large with respect to the magnetization of the pinned magnetic layer. When the pinning magnetic field $H_{ua}{}^*$ is large, as described in the conventional example, a large regeneration output is produced by reducing the height of the magnetoresistive film.

The nonmagnetic middle layer 4 is a layer formed of a nonmagnetic conductive material, and serves as a spacer for separating the pinned magnetic layer 3 from the free magnetic layer 5. The nonmagnetic middle layer 4 is formed, for example, of a Cu film with a thickness of 26 angstroms.

The free magnetic layer 5 is a layer formed of a soft magnetic material having magnetization which freely rotates in accordance with the external magnetic field. The free magnetic layer 5 is formed, for example, of a two-layer film of a CoFeB alloy film with a thickness of 10 angstroms and NiFe alloy film with a thickness of 20 angstroms. Here, for the free magnetic layer 5, the CoFeB alloy is employed as the material of the film formed adjacent to the nonmagnetic middle layer 4, because the CoFeB fails to easily diffuse mutually with Cu as compared with the NiFe alloy.

The magnetization of the free magnetic layer 5 rotates in a plane of the free magnetic layer 5 in accordance with a signal magnetic field $H_{sig}$ from the magnetization of each one-bit region of the magnetic disk 103. A sheet resistance $\rho/t$ of the magnetoresistive film 10 largely changes in accordance with an angle formed by magnetization directions of the free magnetic layer 5 and pinned magnetic layer 3 by a so-called giant magnetoresistive effect.

Figure 4:
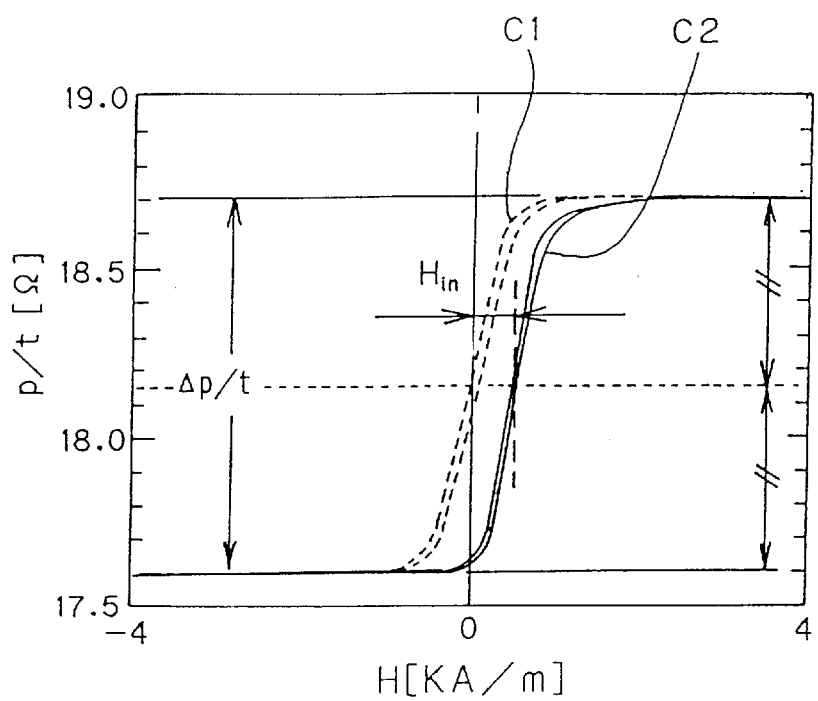
FIG. 4 is a graph showing a state of resistance change of the magnetoresistive film in accordance with an external magnetic field.

FIG. 4 is a graph showing a state of resistance change of the magnetoresistive film in accordance with the external magnetic field.

In FIG. 4, the abscissa indicates the magnitude of an external magnetic field H, and the ordinate indicates a sheet resistance $\rho/t$ of the magnetoresistive film. Here, a direction reverse to the direction in which the fixed magnetization of the pinned magnetic layer is directed is set to be a positive direction of the external magnetic field H.

In FIG. 4, a curve c1 of a broken line shows one example of a $\rho$-H curve of the magnetoresistive film. When the external magnetic field H is applied in a negative direction, the magnetization of the free magnetic layer is inclined in the magnetization direction of the pinned magnetic layer to decrease the sheet resistance $\rho/t$ of the magnetoresistive film. When the external magnetic field H is sufficiently large in the negative direction, the magnetization directions of these layers are matched with each other in the same direction and the sheet resistance $\rho/t$ is minimized. Moreover, when the external magnetic field H is applied in a positive direction, the magnetization of the free magnetic layer is inclined in a direction opposite to the magnetization direction of the pinned magnetic layer and the sheet resistance $\rho/t$ of the magnetoresistive film increases. When the external magnetic field H is sufficiently large in the positive direction, the magnetization directions of these layers are directed in the opposite directions and the sheet resistance $\rho/t$ is maximized. A difference between a maximum value and a minimum value of the sheet resistance $\rho/t$ is the resistance change $\Delta\rho/t$.

When the external magnetic field H changes, a change of sheet resistance $\rho/t$ of the magnetoresistive film 10 is caused, and through the sense current, a regeneration signal is outputted in accordance with the change of the sheet resistance $\rho/t$. In the example of the curve c1, the external magnetic field H is in the vicinity of 0 kA/m, and the sheet resistance $\rho/t$ substantially linearly responds to the external magnetic field H, and from the value of the sheet resistance $\rho/t$ in the external magnetic field H of 0 kA/m, the maximum and minimum values of the sheet resistance p/t take substantially symmetric values to form an ideal $\rho$-H curve.

However, in general, the free magnetic layer is provided with the interlayer coupling field $H_{in}$ from the pinned magnetic layer. When the interlayer coupling field $H_{in}$ exists, the $\rho$-H curve deviates from the $\rho$-H curve shown by the curve c1 by the interlayer coupling field $H_{in}$ in the direction of the external magnetic field H, like the $\rho$-H curve represented by a curve c2 of a solid line in FIG. 4. As seen from the curve c2, when the interlayer coupling field $H_{in}$ exists, the sheet resistance $\rho/t$ fails to linearly respond to the external magnetic field H, a regeneration waveform generated in accordance with the change of the sheet resistance $\rho/t$ of the magnetoresistive film is strained, and the substantial regeneration output decreases. Additionally, in other words, the magnitude of the interlayer coupling field $H_{in}$ is obtained by measurement of the $\rho$-H curve.

Moreover, by increasing the external magnetic field H in the positive direction as described above, the magnetization of the free magnetic layer is directed in the direction opposite to the magnetization direction of the pinned magnetic layer and the sheet resistance $\rho/t$ reaches its maximum value. Subsequently, by further increasing the external magnetic field H in the positive direction, the magnetization of the pinned magnetic layer is also reversed and tries to turn to the positive direction. Then, the sheet resistance $\rho/t$ again decreases, and here the $\rho$-H curve has its peak. When a pinning force of the magnetization of the pinned magnetic layer becomes stronger, the sheet resistance p/t hardly decreases, and a mesial magnitude width of the peak increases. Moreover, when the external magnetic field H is sufficiently increased in the positive direction, and then decreased again, because of hysteresis, even with the same value of the external magnetic field H, the indicated sheet resistance $\rho/t$ is different from the sheet resistance with the increase of the external magnetic field H, but the $\rho$-H curve still has the peak. The pinning magnetic field $H_{ua}{}^*$ as a standard of pinning strength is defined by an average value of two peak mesial magnitude widths.

The spin filter layer 6 is a layer of a nonmagnetic conductive material, and is formed, for example, of a Cu film with a thickness of 15 angstroms. The spin filter layer 6 has a function of reducing the interlayer coupling field $H_{in}$. Alternatively, a specular film formed by oxidizing the vicinity of the interface of the free magnetic layer 5 on the side of the protective layer 7 described below may be employed, and also in this case the interlayer coupling field $H_{in}$ is reduced.

In general, like the magnetoresistive film 10 of the present embodiment, for the magnetoresistive film of a so-called reverse lamination structure in which the antiferromagnetic layer, pinned magnetic layer, nonmagnetic middle layer, and free magnetic layer are formed in order on the underlayer, as compared with the magnetoresistive film with a so-called forward lamination structure constituted by forming the free magnetic layer, nonmagnetic middle layer, pinned magnetic layer, and antiferromagnetic layer in order on the underlayer, the resistance change $\Delta\rho/t$ is large, but it is also known that the interlayer coupling field $H_{in}$ easily increases. The spin filter layer or the specular film is generally employed in the magnetoresistive film of the reverse lamination structure, and has a function of reducing the interlayer coupling field $H_{in}$.

The protective layer 7 is a layer high in anticorrosion, physically and chemically protects the other respective layers constituting the magnetoresistive film 10, and is formed, for example, of a Ta film with a thickness of 30 angstroms.

A manufacture of the magnetoresistive film 10 constituted of these respective layers is performed by continuously laminating the respective layers constituting the magnetoresistive film 10 in order on a multilayered film of the nonmagnetic substrate 21/lower shield layer 22/lower insulation layer 23 with the first substrate layer 1_1 adjacent thereto by DC magnetron sputtering in an Ar atmosphere and by using the illustrated materials of the respective layers with the illustrated thickness. Additionally, to regularize the PdPtMn alloy constituting the antiferromagnetic layer 2, while a magnetic field with a magnitude sufficient to saturate the magnetization of the entire pinned magnetic layer 3 including the antiparallel coupling middle layer 3_2, for example, an external magnetic field of 800 kA/m or more is applied to the entire laminated film, for example, a heat treatment of 250° C. is performed.

Additionally, the aforementioned respective layers are preferably provided with the aforementioned thickness and formed of the illustrated materials, but are not necessarily limited to the thickness and materials as long as the respective layer functions are not deteriorated.

The magnetoresistive film 10 of the present embodiment is largely characterized in that the pinned magnetic layer 3 is constituted of the laminated ferri-film and the second underlayer 1_2 comprises Ru. Generally in the magnetoresistive film, it is known that when the pinned magnetic layer comprises the laminated ferri-film, as compared with the pinned magnetic layer of the single-layer film, the resistance change $\Delta\rho/t$ is large, and the interlayer coupling field $H_{in}$ easily increases.

For the conventional magnetoresistive film, for example, the magnetoresistive film constituted by replacing the second underlayer 1_2 of the magnetoresistive film 10 of the present embodiment with the layer of the NiFe alloy film is provided with the reverse lamination structure, the antiferromagnetic layer 2 comprises the ordered-form alloy, and the pinned magnetic layer 3 comprises the laminated ferri-film. This is preferable for increasing the regeneration output, in that the resistance change $\Delta\rho/t$ is large, $H_{ua}^*$ is large, and the height of the magnetoresistive film can be reduced, but there are problems that the interlayer coupling field $H_{in}$ easily increases and the increase of the regeneration output is depressed.

For the conventional magnetoresistive film, the interlayer coupling field $H_{in}$ can be reduced by changing the pinned magnetic layer to the single-layer film from the laminated ferri-film. However, when the pinned magnetic layer is set to be the single-layer film, the resistance change $\Delta\rho/t$ decreases, further it is difficult to reduce the height of the magnetoresistive film, and therefore the regeneration output of the magnetoresistive film is deteriorated in consideration of all factors.

On the other hand, for the magnetoresistive film 10 of the present embodiment, by a synergistic effect of the pinned magnetic layer 3 of the laminated ferri-film and the second underlayer 1_2 of Ru, as described later in the example, the magnetoresistive film is constituted in such a manner that the magnitude of the interlayer coupling field $H_{in}$ considerably decreases and the substantially large regeneration output is produced.

The magnetic head 30 provided with the magnetoresistive film 10 according to the present embodiment indicates a large regeneration output, and the HDD 100 employing the magnetic head 30 according to the present embodiment is high in sensitivity for detecting the magnetization directions of respective points on the magnetic disk 103 and is suitable for regeneration of information recorded in high density on a magnetic recording medium.

As described above, in the magnetoresistive film 10 of the present embodiment, as compared with the conventional magnetoresistive film in which the pinned magnetic layer comprises the laminated ferri-film, the magnitude of the interlayer coupling field $H_{in}$ considerably decreases. As described later, a cause of the decrease is considered to lie in smoothening of the interface of the pinned magnetic layer 3, nonmagnetic middle layer 4, and free magnetic layer 5 attributed to enhancement of a matching property of a crystal lattice in the interface between the underlayer 1 and the antiferromagnetic layer 2, particularly in smoothening of the interface of the pinned magnetic layer 3 of the laminated ferri-film. Respective types of crystal lattice will next be described, the function of the NiFe alloy in the underlayer of β-Ta/NiFe frequently used in the conventional magnetoresistive film will be described, then the matching property will be described. Additionally, the following description is performed while appropriately referring to

TABLE 1

| Element | Crystal structure | Closest interatomic distance [angstroms] | Melting point [° C.] |
| --- | --- | --- | --- |
| Pd | fcc | 2.7505 | 1555 |
| Pt | fcc | 2.774 | 1774 |
| Mn | bcc | 2.24 to 2.96 | 1244 |
|  | fcc | 2.732 | — |
| Ni | fcc | 2.4919 | 1455 |
| Ru | hcp | 2.704 | 2450 |

A leftmost column of Table 1 represents Pd, Pt, Mn, Ni, and Ru as typical elements constituting the materials of the antiferromagnetic layer and underlayer of the magnetoresistive film, and a topmost row of the table shows items such as element name, crystal structure, closest interatomic distance, and melting point of a simple-body metal formed of each of the elements. Other respective boxes of the table show information of the respective metals with respect to the respective items. Additionally, the closest interatomic distance and melting point indicate values of the respective metals in a bulk under a normal temperature/pressure. When the underlayer and antiferromagnetic layer are formed by sputtering or the like, the layers are adjacent by a closest surface in many cases, and the closest interatomic distance is a measure of the matching property.

FIG. 5 shows diagrams of an fcc structure and the closest surface of the fcc structure, FIG. 6 shows diagrams of a bcc structure and the closest surface of the bcc structure, and FIG. 7 shows diagrams of an hcp structure and the closest surface of the hcp structure.

In FIGS. 5 to 7, a plurality of small circles represent atoms.

Figure 5A:
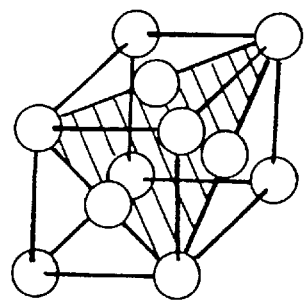
FIGS. 5A and 5B are diagrams showing an fcc structure and a closest surface of the fcc structure.
Figure 5B:
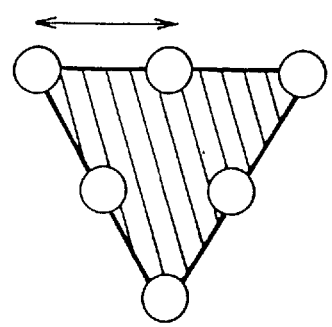

FIG. 5A shows a unit lattice of the fcc structure, and in the unit lattice, a (111) plane shown by slant lines represents the closest surface of the fcc structure. FIG. 5B shows the extracted fcc structure (111) plane, and an interatomic distance shown by an arrow of the drawing indicates the closest interatomic distance. The NiFe alloy film constituting the underlayer of the magnetoresistive film or the PdPtMn alloy film constituting the antiferromagnetic layer is provided with the fcc structure. The closest interatomic distance of the NiFe alloy film is 2.509 angstroms, and the closest interatomic distance of the PdPtMn alloy film is 2.780 angstroms.

Figures 6A, 6B:
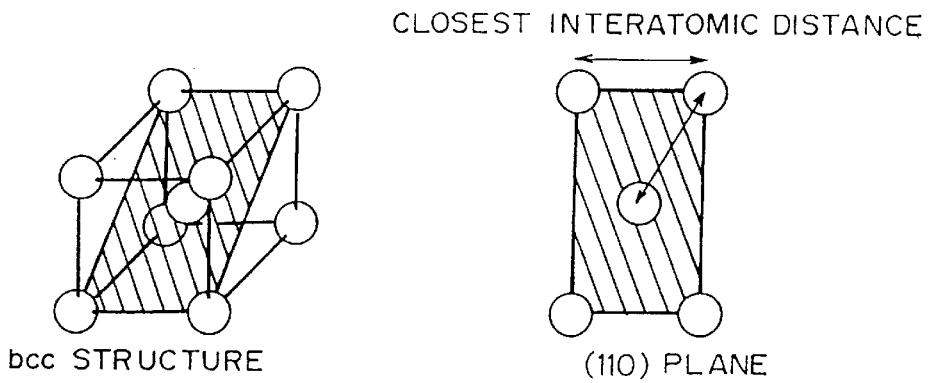
FIGS. 6A and 6B are diagrams showing a bcc structure and the closest surface of the bcc structure.

FIG. 6A shows the unit lattice of the bcc structure, and in the unit lattice, a (110) plane shown by slant lines represents the closest surface of the bcc structure. FIG. 6B shows the extracted bcc structure (110) plane, and the interatomic distance shown by the arrow of the drawing indicates the closest interatomic distance.

Figures 7A, 7B:
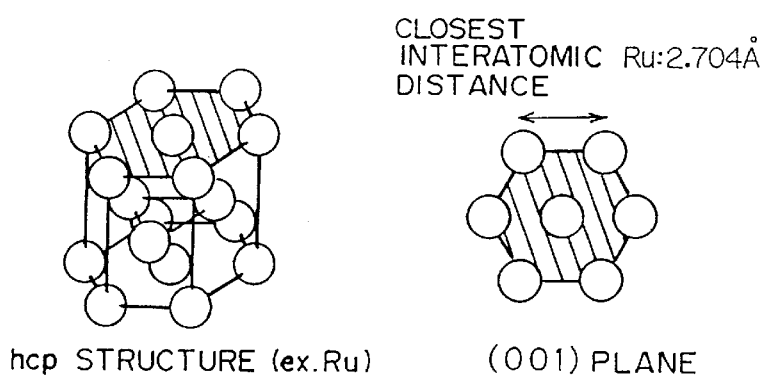
FIGS. 7A and 7B are diagrams showing an hcp structure and the closest surface of the hcp structure.

FIG. 7A shows the unit lattice of the hcp structure, and in the unit lattice, a (001) plane shown by slant lines represents the closest surface of the hcp structure. FIG. 7B shows the extracted hcp structure (001) plane, and the interatomic distance shown by the arrow of the drawing indicates the closest interatomic distance. The Ru film constituting the underlayer of the magnetoresistive film 10 of the present embodiment is provided with the hcp structure, and the closest interatomic distance of the Ru film is 2.704 angstroms.

Additionally, the underlayer of β-Ta/NiFe is a general layer which has been used from a period of the magnetic head using an anisotropic magnetoresistive (AMR) film. When the antiferromagnetic layer of the PdPtMn alloy is laminated on the underlayer of β-Ta/NiFe, either the NiFe alloy or the PdPtMn alloy is provided with the fcc structure during film formation, and usually in the film formation by sputtering, the fcc (111) plane is preferentially oriented. Here, β-Ta assists fcc (111) orientation of ten NiFe alloy, and the NiFe alloy assists the fcc (111) orientation of the PdPtMn alloy. Actually, for the enhancement of orientation property, the magnetoresistive film with the NiFe alloy used in the underlayer is higher in the pinning magnetic field $H_{ua}*$ and larger in resistance change $\Delta\rho/t$ than the magnetoresistive film in which only β-Ta is used in the underlayer without using the NiFe alloy, and this appears in an experiment result.

The PdPtMn alloy film hardly realizes the fcc (111) orientation, because Mn has a composition usually of around 50 atom % and has a largest proportion among three types of elements included in the PdPtMn alloy and different from one another in atomic radius, and Mn constitutes the fcc structure when alloyed with Pd and Pt, but a simple body of Mn constitutes the strained bcc structure instead of the fcc structure. Therefore, when the PdPtMn alloy film is directly laminated on β-Ta fundamentally different in crystal structure, coupling between the atom of β-Ta and the atom of the PdPtMn alloy is easily disordered. On the other hand, the NiFe alloy used in the underlayer generally has a composition with a large proportion of Ni having the fcc structure with the simple body, and easily performs (111) orientation. When the NiFe alloy film with good (111) orientation is inserted between β-Ta and PdPtMn alloy, the orientation of the PdPtMn alloy film is enhanced. For the aforementioned reasons, the NiFe alloy has been heretofore used as the direct substrate of the antiferromagnetic layer of the PdPtMn alloy in the magnetoresistive film.

Additionally, the NiFe alloy film also has the following problems as the substrate of the PdPtMn alloy film.

Figure 8:
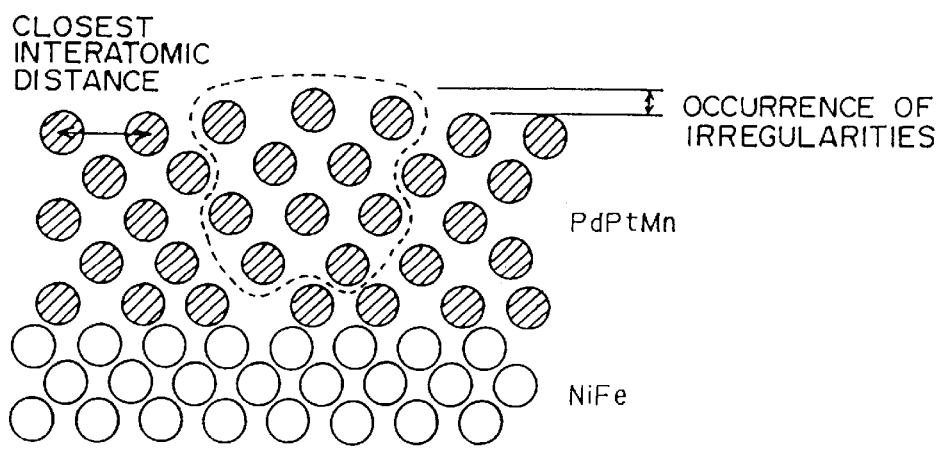
FIG. 8 is a diagram showing a state of lamination of a PdPtMn alloy film on an NiFe alloy film.

FIG. 8 is a diagram showing a lamination state of the PdPtMn alloy film on the NiFe alloy film.

In FIG. 8, a plurality of regularly arranged white small circles represent atoms constituting the NiFe alloy film, and on the NiFe alloy film represented by these small circles, the atoms constituting the PdPtMn alloy film are represented by a plurality of slant-line small circles arranged in a slightly disordered form.

As described above, the closest interatomic distance in the (111) plane of the NiFe alloy is 2.509 angstroms, the closest interatomic distance in the (111) plane of the PdPtMn alloy is 2.780 angstroms, and the closest interatomic distance of the PdPtMn alloy is slightly large. Therefore, in order to grow the (111) plane of the PdPtMn alloy on the (111) plane of the NiFe alloy in a heteroepitaxial manner, the atoms with particularly large atomic radii, such as Pt and Pd, have to be packed in a narrow site, and lattice mismatch and defect are easily generated. In FIG. 8, a portion surrounded by a dotted line shows a defective portion generated by the lattice mismatch. Since the antiferromagnetic layer secures a high pinning magnetic field $H^{ua}*$, the thickness is generally large between 100 angstroms and 200 angstroms. When the layer grows still including the lattice mismatch and defect, irregularities are easily left on a film surface, the interface of the pinned magnetic layer/nonmagnetic middle layer/free magnetic layer is therefore disordered and the interlayer coupling field $H_{in}$ is supposedly increased as a result. Furthermore, when the pinned magnetic layer is constituted of the laminated ferri-film, by the influence of disorder or the like of the interface of the respective layers constituting the laminated ferri-film, the interlayer coupling field $H_{in}$ is considered to further increase.

Figure 9:
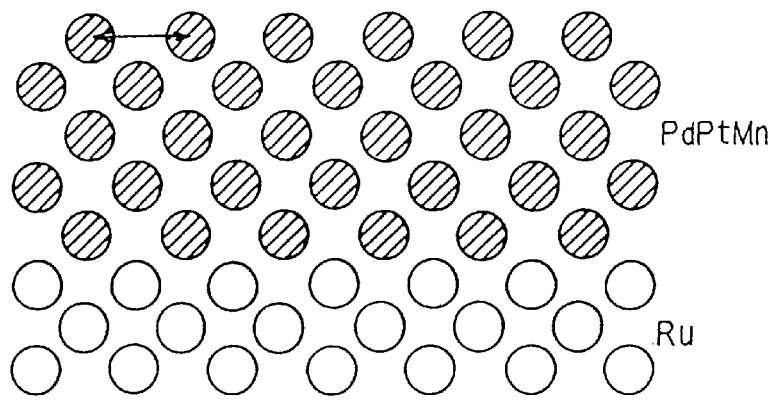
FIG. 9 is a diagram showing a state of lamination of the PdPtMn alloy film on an Ru film.

On the other hand, when the Ru film is used as the direct substrate of the antiferromagnetic layer, the lamination state differs as shown in FIG. 9.

FIG. 9 is a diagram showing a lamination state of the PdPtMn alloy film on the Ru film.

In FIG. 9, similarly as FIG. 8, a plurality of regularly arranged white small circles represent atoms constituting the Ru film, and the atoms constituting the PdPtMn alloy film are represented by a plurality of slant-line small circles arranged on the Ru film represented by the small circles. Additionally, the atoms constituting the PdPtMn alloy film formed on the Ru film are regularly arranged. The atoms constituting the PdPtMn alloy film are regularly arranged in this manner, because fcc (111) plane of the PdPtMn alloy film is laminated on hcp (001) plane of Ru, the closest interatomic distance in the hcp (001) plane of Ru is 2.704 angstroms, and is very close to 2.780 angstroms as the closest interatomic distance in the fcc (111) plane of the PdPtMn alloy film as compared with the closest interatomic distance of 2.509 angstroms in the (111) plane of the NiFe alloy, and the matching property of the crystal lattice is satisfactory in the interface between the underlayer 1 and the antiferromagnetic layer 2. As described above, a reason why the interlayer coupling field $H_{in}$ of the magnetoresistive film 10 of the present embodiment decreases lies in such lattice matching between the underlayer of Ru and the antiferromagnetic layer of the PdPtMn alloy.

Therefore, the material is not limited to Ru, and may satisfy a condition that closest surface orientation is easily caused, the closest surface has a plane structure similar to that of the fcc (111) plane of the ordered-form alloy including Mn such as PdPtMn alloy, and the closest interatomic distance is preferably in a range of ±8% from the closest interatomic distance of the ordered-form alloy (111) plane. By using the material in the underlayer, the heteroepitaxial growth of the ordered-form alloy constituting the antiferromagnetic layer is assisted, and the interlayer coupling field $H_{in}$ is considered to be reduced by inhibiting the disorder (irregularities) of growth surface.

As the underlayer material satisfying the condition with respect to the PdPtMn alloy whose closest interatomic distance is 2.780 angstroms, there are exemplified: (1) metals such as Cd, Ru, Os, Re, Tc, Ti, Zn which have the hcp crystal structure, and perform (001) plane orientation as the closest surface orientation; (2) metals such as Al, Au, Ir, Pd, Pt, Rh, Ag which have the fcc crystal structure, and perform (111) plane orientation as the closest surface orientation; (3) metals such as Nb, Mo, W, V, α-Ta which have the bcc crystal structure, and perform (110) plane orientation as the closest surface orientation; and respective alloys using elements constituting these respective metals as main constituting elements. Additionally, the closest interatomic distance of $Pt_{50}Mn_{50}$ (atom %) is 2.702 angstroms, the closest interatomic distance of $Ni_{45}Mn_{55}$ (atom %) is 2.66 angstroms, and in this manner, the ordered-form alloy including Mn other than the PdPtMn alloy also has the closest interatomic distance of the same degree as that of the PdPtMn alloy. Therefore, the metals and alloys described in the above (1) to (3) are also preferable underlayer materials with respect to the general ordered-form alloy including Mn. Moreover, in the simple-body metal and alloy, in order to match the inter-lattice distance with the material constituting the antiferromagnetic layer without largely changing the crystal structure, or to enhance magnetic property, anticorrosion, heat resistance, and other properties, nonmetallic materials such as B, C, N, O may be added.

Additionally, except the lattice match, a high melting point of Ru is another cause of the decrease of the interlayer coupling field $H_{in}$ in the magnetoresistive film having the underlayer of Ru. For the NiFe alloy, since the melting point is relative low, grain growth easily advances, the surface irregularities easily increase. However, for Ru, the melting point is high as compared with Ni or the NiFe alloy. Therefore, even when a thin film is formed, crystal grain growth in a film in-plane direction is slow and small, and the surface irregularities are considered to be inhibited from increasing. In this manner, as the material constituting the underlayer, the melting point is preferably higher than that of the NiFe alloy. Moreover, the crystal structure of Ru is not fcc but hcp, and this is another cause of the retarded crystal grain growth and inhibited surface irregularities.

Furthermore, Japanese Patent No. 2925542 describes a magnetoresistive film in which the underlayer of Ru is employed as the substrate of the antiferromagnetic material.

Additionally, the invention disclosed in this publication relates to inhibition of deterioration of resistance change ratio $\Delta\rho/t$ by lowering of regularization temperature of the antiferromagnetic layer during film formation, and an object thereof is far different from the object of the present invention. Moreover, when the substrate material is simply changed, the decrease of the interlayer coupling field $H_{in}$ is small, and the resistance change $\Delta\rho/t$ decreases, so that in consideration of all factors, the regeneration output is not necessarily enhanced. On the other hand, the magnetoresistive film of the present invention is different from the magnetoresistive film of the invention described in the publication in that the substrate formed of the materials such as Ru is employed and the pinned magnetic layer is formed of the laminated ferri-film, and by this constitution, the interlayer coupling field $H_{in}$ is remarkably reduced, and the regeneration output is largely enhanced.

An example of the present invention will be described hereinafter.

EXAMPLE

Measurement results of dependence of the thickness of the second underlayer of Ru on the resistance change $\Delta\rho/t$, interlayer coupling field $H_{in}$, and pinning magnetic field $H_{ua}{}^*$ of the magnetoresistive film 10 described in the present embodiment will be described hereinafter.

A sample used in the measurement was prepared by setting the thickness of the second underlayer 1_2 of Ru of the magnetoresistive film 10 of the present embodiment to thickness $t_{Ru}$, and forming a magnetoresistive film with a constitution of Ta (50 angstroms)/Ru ($t_{Ru}$ angstroms)/PdPtMn (150 angstroms)/CoFeB (12.5 angstroms)/Ru (7.5 angstroms)/CoFeB (20 angstroms)/Cu (26 angstroms)/CoFeB (10 angstroms)/NiFe (20 angstroms)/Cu (15 angstroms)/Ta (30 angstroms) on an $Si/SiO_2$ substrate. Here, five types of samples were prepared by setting the thickness $t_{Ru}$ of the second underlayer 1_2 to 12, 14, 16, 18, 20 angstroms. These samples were formed in the method described in the embodiment.

Moreover, for comparison, among the five types of samples, the material constituting the second underlayer 1_2 of the sample with the thickness $t_{Ru}$ of the second underlayer 1_2 of 18 angstroms was changed to NiFe from Ru to prepare a substrate comparative sample, and the aforementioned measurement was also performed with respect to the substrate comparative sample.

Figure 10:
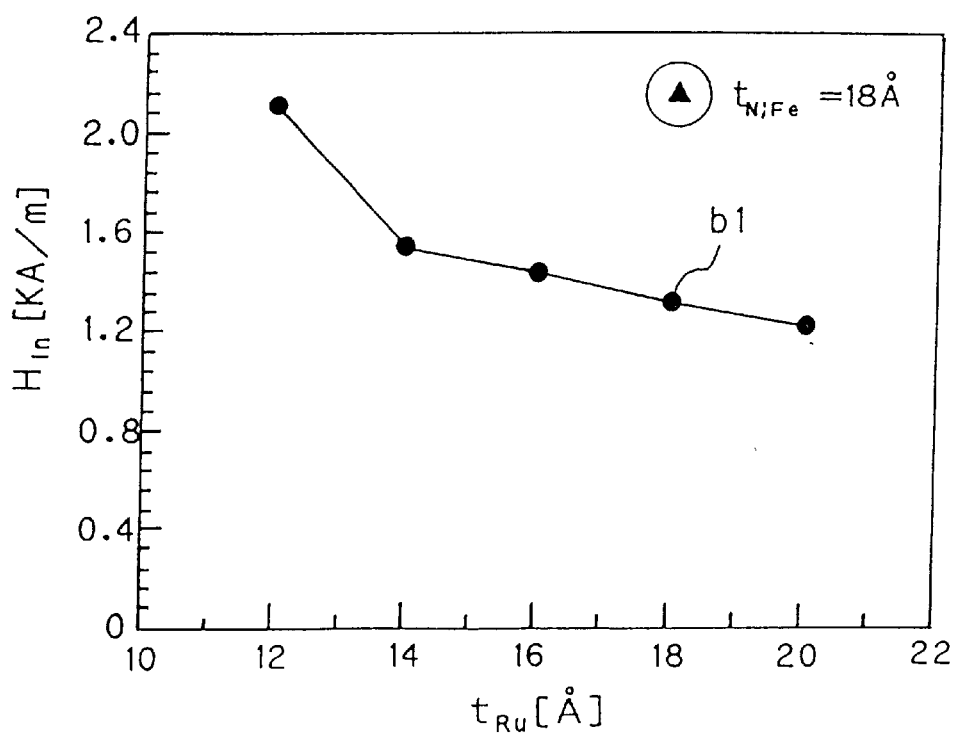
FIG. 10 is a graph showing dependence of an interlayer coupling field $H_{in}$ on a thickness $t_{Ru}$ of a second underlayer of Ru in the magnetoresistive film in which a pinned magnetic layer comprises a laminated ferri-film.
Figure 11:
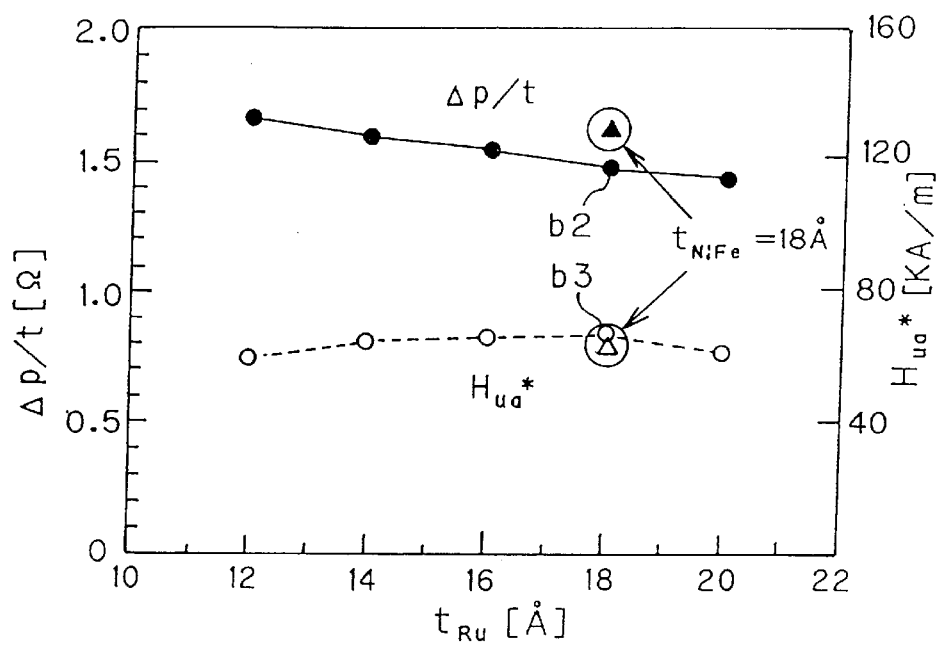
FIG. 11 is a graph showing the dependence of resistance change $\Delta\rho/t$ and pinning magnetic field $H_{ua}*$ on the thickness $t_{Ru}$ of the second underlayer of Ru in the magnetoresistive film in which the pinned magnetic layer comprises the laminated ferri-film.

FIG. 10 is a graph showing the dependence of the interlayer coupling field $H_{in}$ on the thickness $t_{Ru}$ of the second underlayer of Ru in the magnetoresistive film in which the pinned magnetic layer comprises the laminated ferri-film, and FIG. 11 is a graph showing the dependence of the resistance change $\Delta\rho/t$ and pinning magnetic field $H_{ua}{}^*$ on the thickness $t_{Ru}$ of the second underlayer of Ru in the magnetoresistive film in which the pinned magnetic layer comprises the laminated ferri-film.

The abscissa of FIG. 10, 11 indicates the thickness $t_{Ru}$ of the second underlayer 1_2 of Ru. The ordinate of FIG. 10 shows a value of the interlayer coupling field $H_{in}$ of the magnetoresistive film. The ordinate of FIG. 11 shows the values of the resistance change $\Delta\rho/t$ and pinning magnetic field $H_{ua}{}^*$ of the magnetoresistive film.

In FIG. 10, the respective measurement results of the interlayer coupling field $H_{in}$ for the five types of samples are shown by black circles, and the black circles are guided and connected to one another by a solid line. Moreover, in FIG. 10, the measurement result of the interlayer coupling field $H_{in}$ for the substrate comparative sample with the second underlayer of NiFe is shown by a black triangle surrounded by a small circle in the drawing.

As shown by the black triangle, in the substrate comparative sample, the value of the interlayer coupling field $H_{in}$ was as high as 2.2 kA/m. On the other hand, as seen from black circle b1 of FIG. 10, among the samples with the second underlayer of Ru, for the sample with the thickness $t_{Ru}$ of 18 angstroms, the value of the interlayer coupling field $H_{in}$ was 1.3 kA/m, and decreased by 40% or more as compared with the value of the interlayer coupling field $H_{in}$ of the substrate comparative sample. Moreover, as shown by a plurality of black circles of FIG. 10, in the sample with the second underlayer of Ru, with the increase of the thickness $t_{Ru}$, the value of the interlayer coupling field $H_{in}$ tends to decrease, and the value of the interlayer coupling field $H_{in}$ can further be decreased by adjusting the thickness $t_{Ru}$. In these samples, when the thickness $t_{Ru}$ is 14 angstroms or more, the interlayer coupling field $H_{in}$ indicates a small value below 1.6 kA/m.

In FIG. 11, the respective measurement results of the resistance change $\Delta\rho/t$ for the five types of samples are shown by the black circles, and the black circles are guided and connected to one another by the solid line. Moreover, in FIG. 11, the measurement result of the resistance change $\Delta\rho/t$ for the substrate comparative sample is shown by the black triangle surrounded by the small circle in the drawing.

As shown by the black triangle of FIG. 11, in the substrate comparative sample, the value of the resistance change $\Delta\rho/t$ was as high as 1.6 Ω. On the other hand, as seen from black circle b2 of FIG. 11, among the samples with the second underlayer of Ru, for the sample with the thickness $t_{Ru}$ of 18 angstroms, the value of the resistance change $\Delta\rho/t$ decreased by about 0.15 Ω from the value of the resistance change $\Delta\rho/t$ of the substrate comparative sample but kept a high value. Moreover, as shown by the plurality of black circles of FIG. 11, each of the samples with the second underlayer of Ru indicates a large resistance change $\Delta\rho/t$ of 1.4 Ω or more. Furthermore, in these samples, with the decrease of the thickness $t_{Ru}$, the value of the resistance change $\Delta\rho/t$ tends to increase, and the value of the resistance change $\Delta\rho/t$ can further be increased by adjusting the thickness $t_{Ru}$.

Moreover, in FIG. 11, the respective measurement results of the pinning magnetic field $H_{ua}*$ for the five types of samples are shown by white circles, and the white circles are guided and connected to one another by a broken line. Furthermore, in FIG. 11, the measurement result of the resistance change $\Delta\rho/t$ for the substrate comparative sample is shown by a white triangle surrounded by the small circle in the drawing.

As shown by the white triangle of FIG. 11, in the substrate comparative sample, the value of the pinning magnetic field $H_{ua}*$ was 64 kA/m. On the other hand, as seen from white circle b3, among the samples with the second underlayer of Ru, for the sample with the same thickness $t_{Ru}$ of 18 angstroms as the thickness of the second underlayer of the substrate comparative sample, the value of the pinning magnetic field $H_{ua}*$ increased by about 2 kA/m. Moreover, as shown by the plurality of black circles of FIG. 11, each of the samples with the second underlayer of Ru indicates a large value of pinning magnetic field $H_{ua}*$ of 60 kA/m or more.

As seen from these measurement results, for the magnetoresistive film 10 in which the pinned magnetic layer 3 comprises the laminated ferri-film and the second underlayer 1_2 comprises Ru, similarly with the second underlayer 1_2 of NiFe, the large pinning magnetic field $H_{ua}*$ is kept, the large value of the resistance change $\Delta\rho/t$ characteristic with the pinned magnetic layer 3 of the laminated ferri-film is substantially kept, and the value of the interlayer coupling field $H_{in}$ is preferably considerably reduced.

COMPARATIVE EXAMPLE

A comparative example of the present invention will be described hereinafter. In the aforementioned example, the example in which the underlayer comprises Ru and the pinned magnetic layer comprises the laminated ferri-film has been described, but this comparative example is an example in which the underlayer comprises Ru but the pinned magnetic layer comprises a single-layer film.

The measurement results of dependence of the thickness of the second underlayer of Ru with respect to the resistance change $\Delta\rho/t$, interlayer coupling field $H_{in}$ and pinning magnetic field $H_{ua}*$ of the magnetoresistive film constituted by replacing the pinned magnetic layer 3 of the magnetoresistive film 10 by the single-layer film will be described hereinafter.

A sample used in the measurement was prepared by forming a magnetoresistive film with a constitution of Ta (50 angstroms)/Ru ($t_{Ru}$ angstroms)/PdPtMn (200 angstroms)/CoFeB (20 angstroms)/Cu (26 angstroms)/CoFeB (10 angstroms)/NiFe (20 angstroms)/Cu (15 angstroms)/Ta (30 angstroms) on the Si/SiO$_2$ substrate. Here, three types of samples were prepared by setting the thickness $t_{Ru}$ of the second underlayer of Ru to 16, 18, 20 angstroms. These samples were similarly formed in the method described in the embodiment, except that the pinned magnetic layer comprises the single-layer film.

Moreover, for comparison, among the three types of samples, the material constituting the second underlayer 1_2 of the sample with the thickness $t_{Ru}$ of the second underlayer 1_2 of 18 angstroms was changed to NiFe from Ru to prepare the substrate comparative sample, and the aforementioned measurement was also performed with respect to the substrate comparative sample.

Figure 12:
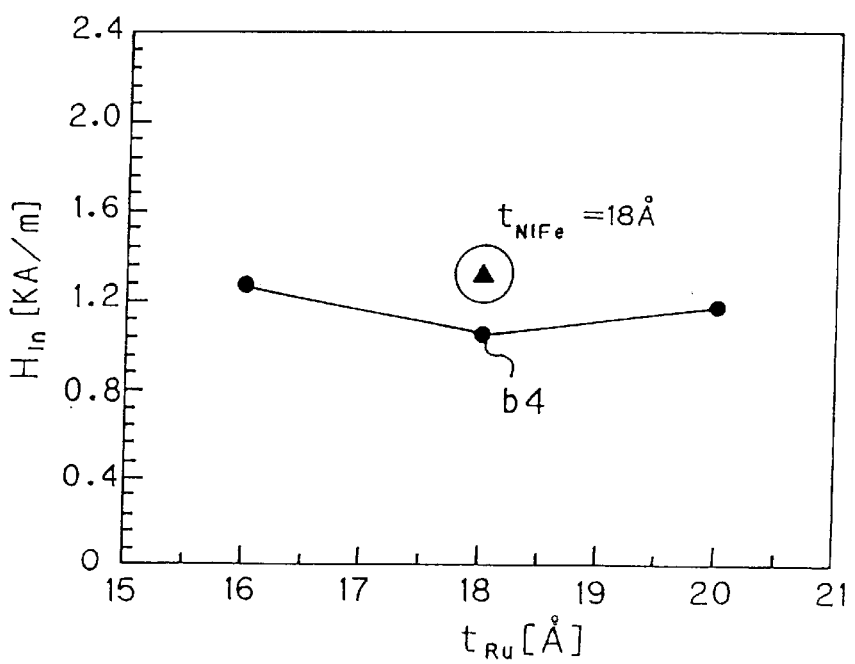
FIG. 12 is a graph showing the dependence of the interlayer coupling field $H_{in}$ on the thickness $t_{Ru}$ of the second underlayer of Ru in the magnetoresistive film in which the pinned magnetic layer comprises a single-layer film.
Figure 13:
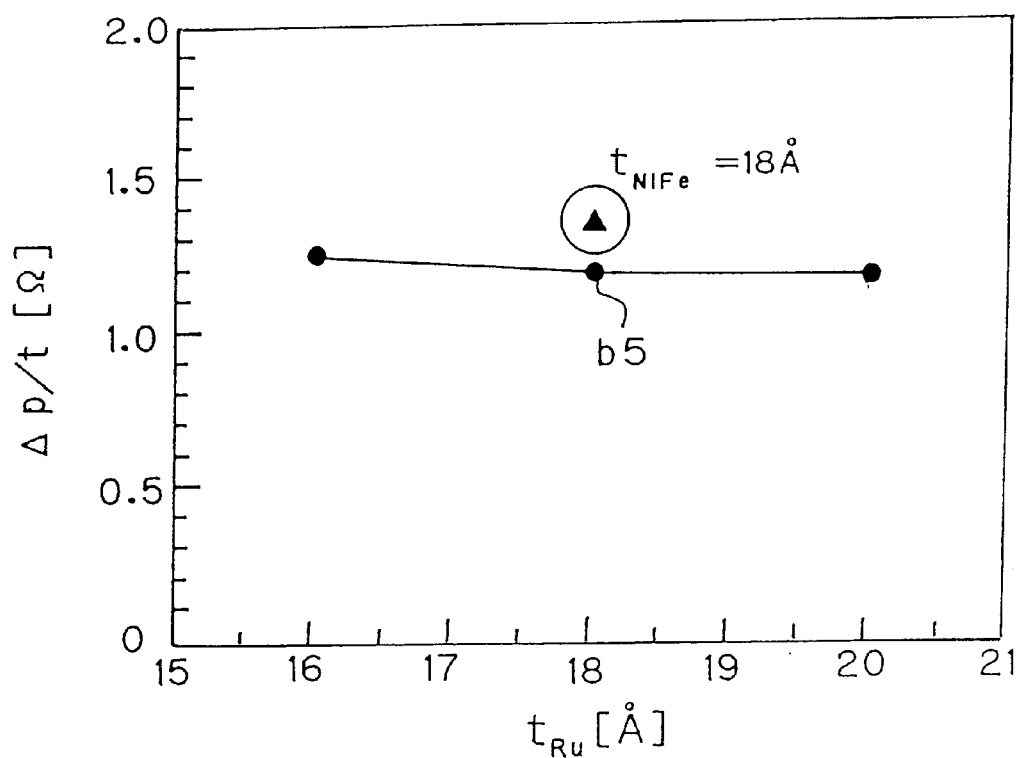
FIG. 13 is a graph showing the dependence of the resistance change $\Delta\rho/t$ on the thickness $t_{Ru}$ of the second underlayer of Ru in the magnetoresistive film in which the pinned magnetic layer comprises the single-layer film.

FIG. 12 is a graph showing the dependence of the interlayer coupling field $H_{in}$ on the thickness $t_{Ru}$ of the second underlayer of Ru in the magnetoresistive film in which the pinned magnetic layer comprises the single-layer film, and FIG. 13 is a graph showing the dependence of the resistance change $\Delta\rho/t$ on the thickness $t_{Ru}$ of the second underlayer of Ru in the magnetoresistive film in which the pinned magnetic layer comprises the single-layer film.

Similarly as FIG. 10, 11, the abscissa of FIG. 12, 13 indicates the thickness $t_{Ru}$ of the second underlayer 1_2 of Ru. The ordinate of FIG. 12 shows the value of the interlayer coupling field $H_{in}$ of the magnetoresistive film similarly as the ordinate of FIG. 10. The ordinate of FIG. 13 shows the value of the resistance change $\Delta\rho/t$ of the magnetoresistive film similarly as the ordinate of FIG. 11.

In FIG. 12, the respective measurement results of the interlayer coupling field $H_{in}$ for the three types of samples are shown by the black circles, and the black circles are guided and connected to one another by the solid line. Moreover, in FIG. 12, the measurement result of the interlayer coupling field $H_{in}$ for the sample with the second underlayer of NiFe is shown by the black triangle surrounded by the small circle in the drawing.

As shown by the black triangle of FIG. 12, in the substrate comparative sample, the value of the interlayer coupling field $H_{in}$ was 1.25 kA/m. On the other hand, as seen from black circle b4 of FIG. 12, among the samples with the second underlayer of Ru, for the sample with the thickness $t_{Ru}$ of 18 angstroms, the value of the interlayer coupling field $H_{in}$ was 1.05 kA/m and decreased by about 15% as compared with the value of the interlayer coupling field $H_{in}$ of the substrate comparative sample. This decrease ratio is considerably small as compared with 40% of the pinned magnetic layer 3 of the laminated ferri-film shown in FIG. 10. Moreover, as shown by the plurality of black circles of FIG. 12, in the sample with the second underlayer of Ru, with the thickness $t_{Ru}$ of 16 angstroms or 20 angstroms, the value of the interlayer coupling field $H_{in}$ increased as compared with the thickness of 18 angstroms, and indicated a value exceeding 1.15 kA/m.

In FIG. 13, the respective measurement results of the resistance change $\Delta\rho/t$ for the three types of samples are shown by the black circles, and the black circles are guided and connected to one another by the solid line. Moreover, in FIG. 13, the measurement result of the resistance change $\Delta\rho/t$ for the substrate comparative sample is shown by the black triangle surrounded by the small circle in the drawing.

As shown by the black triangle, in the substrate comparative sample, the value of the resistance change $\Delta\rho/t$ was 1.45 Ω. On the other hand, as seen from black circle b5 of FIG. 13, among the samples with the second underlayer of Ru, for the sample with the thickness $t_{Ru}$ of 18 angstroms, the value of the resistance change $\Delta\rho/t$ decreased by about 0.15 Ωimilarly as the sample with the pinned magnetic layer 3 of the laminated ferri-film shown in FIG. 11. Moreover, as shown by the plurality of black circles of FIG. 13, for each of the samples with the second underlayer of Ru, with the thickness $t_{Ru}$ of 16 angstroms or 20 angstroms, the value decreased by 0.1 Ω to 0.15 Ω as compared with the substrate comparative sample.

As seen from these measurement results, in the magnetoresistive film 10 in which the pinned magnetic layer 3 comprises the single-layer film and the second underlayer 1_2 comprises Ru, the resistance change $\Delta\rho/t$ keeps the value for the second underlayer 1_2 of NiFe, but the value decreases, and the value of the interlayer coupling field $H_{in}$ is not considerably reduced as compared with the case where the pinned magnetic layer 3 comprises the laminated ferri-film.

As seen from the above results, in the magnetoresistive film 10 in which the second underlayer comprises Ru and the pinned magnetic layer 3 comprises the laminated ferri-film, as compared with the magnetoresistive film in which the pinned magnetic layer 3 comprises the single-layer film, the value of the interlayer coupling field $H_{in}$ is slightly large but indicates the same degree of value, and the value of the resistance change $\Delta\rho/t$ preferably increases by about 25%. Furthermore, for the magnetoresistive film 10, since the pinned magnetic layer 3 comprises the laminated ferri-film, the height of the magnetoresistive film is decreased, so that by the value equal to or more than the values in the measurement results of the interlayer coupling field $H_{in}$ and resistance change $\Delta\rho/t$, a substantially large regeneration output is preferably produced.

As described above, according to the present invention, there are provided the magnetoresistive film in which the interlayer coupling field $H_{in}$ is minimized and the large regeneration output is produced, the magnetoresistive head, and the information regeneration apparatus.

What is claimed is:

1. A magnetoresistive film comprising a multilayered film including: an underlayer; an antiferromagnetic layer formed on and in contact with the underlayer; a pinned magnetic layer having magnetization whose direction is fixed by the antiferromagnetic layer; and a free magnetic layer having magnetization whose direction changes in accordance with an external magnetic filed, and indicating a magnitude of resistance in accordance with an angle formed by the magnetization direction of the pinned magnetic layer and the magnetization direction of the free magnetic layer, wherein said pinned magnetic layer comprises a first soft magnetic layer and a second soft magnetic layer formed of soft magnetic materials and an antiparallel coupling middle layer, formed between the soft magnetic layers, for coupling the magnetizations of the soft magnetic layers to each other in opposite directions, said antiferromagnetic layer comprises an ordered-form antiferromagnetic material including Mn, and said underlayer comprises a metal selected from the group consisting of Ru, Os, Re, Tc, Cd, Ti, Zn, Al, Au, Ir, Pd, Pt, Rh, Ag, Nb, Mo, W, V, and α-Ta or an alloy including an element of the selected metal.

2. The magnetoresistive film according to claim 1 wherein said underlayer comprises Ru or an alloy including Ru, instead of the metal selected from said group or the alloy including the selected metal element.

3. The magnetoresistive film according to claim 1 wherein said antiferromagnetic layer comprises a material containing 55 atom % or less of Mn and including an element selected from an element group consisting of Pd, Pt, Ru, Rh, Ir, Au, and Ni.

4. The magneto resistive film according to claim 1, wherein the multilayered film further includes a nonmagnetic middle layer that is formed of a nonmagnetic conductive material and separates the pinned magnetic layer from the free magnetic layer, and wherein the multilayered film has a reverse lamination structure in which the antiferromagnetic layer, the pinned magnetic layer, the nonmagnetic middle layer, and the free magnetic layer are formed in order on the underlayer.

5. A magnetoresistive head comprising a magnetoresistive film which comprises a multilayered film including: an underlayer; an antiferromagnetic layer formed on and in contact with the underlayer; a pinned magnetic layer having magnetization whose direction is fixed by the antiferromagnetic layer; and a free magnetic layer having magnetization whose direction changes in accordance with an external magnetic field and which indicates a magnitude of resistance in accordance with an angle formed by the magnetization direction of the pinned magnetic layer and the magnetization direction of the free magnetic layer, and detecting the magnitude of the resistance of the magnetoresistive film to detect a strength of said external magnetic field, wherein said pinned magnetic layer comprises a first soft magnetic layer and a second soft magnetic layer formed of soft magnetic materials and an antiparallel coupling middle layer, formed between the soft magnetic layers, for coupling the magnetization of the soft magnetic layers to each other in opposite directions, said antiferromagnetic layer comprises an ordered-form antiferromagnetic material including Mn, and said underlayer comprises a metal selected from the group consisting of Ru, Os, Re, Tc, Cd, Ti, Zn, Al, Au, Ir, Pd, Pt, Rh, Ag, Nb, Mo, W, V, and α-Ta or an alloy including an element of the selected metal.

6. The magneto resistive film according to claim 5, wherein the multilayered film further includes a nonmagnetic middle layer that is formed of a nonmagnetic conductive material and separates the pinned magnetic layer from the free magnetic layer, and wherein the multilayered film has a reverse lamination structure in which the antiferromagnetic layer, the pinned magnetic layer, the nonmagnetic middle layer, and the free magnetic layer are formed in order on the underlayer.

7. An information regeneration apparatus comprising a magnetic head, disposed in the vicinity of or in contact with a magnetic recording medium on which information is recorded in accordance with a magnetization direction, for detecting magnetization directions of respective points of the magnetic recording medium, and regenerating the information in accordance with the magnetization directions of the respective points of said magnetic recording medium detected by the magnetic head, wherein said magnetic head comprises a magnetoresistive film which comprises a multilayered film including: an underlayer; an antiferromagnetic layer formed on and in contact with the underlayer; a pinned magnetic layer having magnetization whose direction is fixed by the antiferromagnetic layer; and a free magnetic layer having magnetization whose direction changes in accordance with an external magnetic field and which indicates a magnitude of resistance in accordance with an angle formed by the magnetization direction of the pinned magnetic layer and the magnetization direction of the free magnetic layer, and detects the magnitude of the resistance of the magnetoresistive film to detect a strength of said external magnetic field, said pinned magnetic layer comprises a first soft magnetic layer and a second soft magnetic layer formed of soft magnetic materials and an antiparallel coupling middle layer, formed between the soft magnetic layers, for coupling the magnetizations of the soft magnetic layers to each other in opposite directions, said antiferromagnetic layer comprises an ordered-form antiferromagnetic material including Mn, and said underlayer comprises a metal selected from the group consisting of Ru, Os, Re, Tc, Cd, Ti, Zn, Al, Au, Ir, Pd, Pt, Rh, Ag, Nb, Mo, W, V and α-Ta or an alloy including an element of the selected metal.

8. The magneto resistive film according to claim 7, wherein the multilayered film further includes a nonmagnetic middle layer that is formed of a nonmagnetic conductive material and separates the pinned magnetic layer from the free magnetic layer, and wherein the multilayered film has a reverse lamination structure in which the antiferromagnetic layer, the pinned magnetic layer, the nonmagnetic middle layer, and the free magnetic layer are formed in order on the underlayer.

* * * * *

UNITED STATES PATENT AND TRADEMARK OFFICE
CERTIFICATE OF CORRECTION

PATENT NO. : 6,710,985 B2
DATED : March 23, 2004
INVENTOR(S) : Kenji Noma

It is certified that error appears in the above-identified patent and that said Letters Patent is hereby corrected as shown below:

Column 20,
Line 4, delete "filed" and insert -- field --.

Signed and Sealed this

Twenty-eighth Day of September, 2004

JON W. DUDAS
*Director of the United States Patent and Trademark Office*